P. L. SAMPLE.
PISTON.
APPLICATION FILED AUG. 5, 1914.
1,134,911. Patented Apr. 6, 1915.
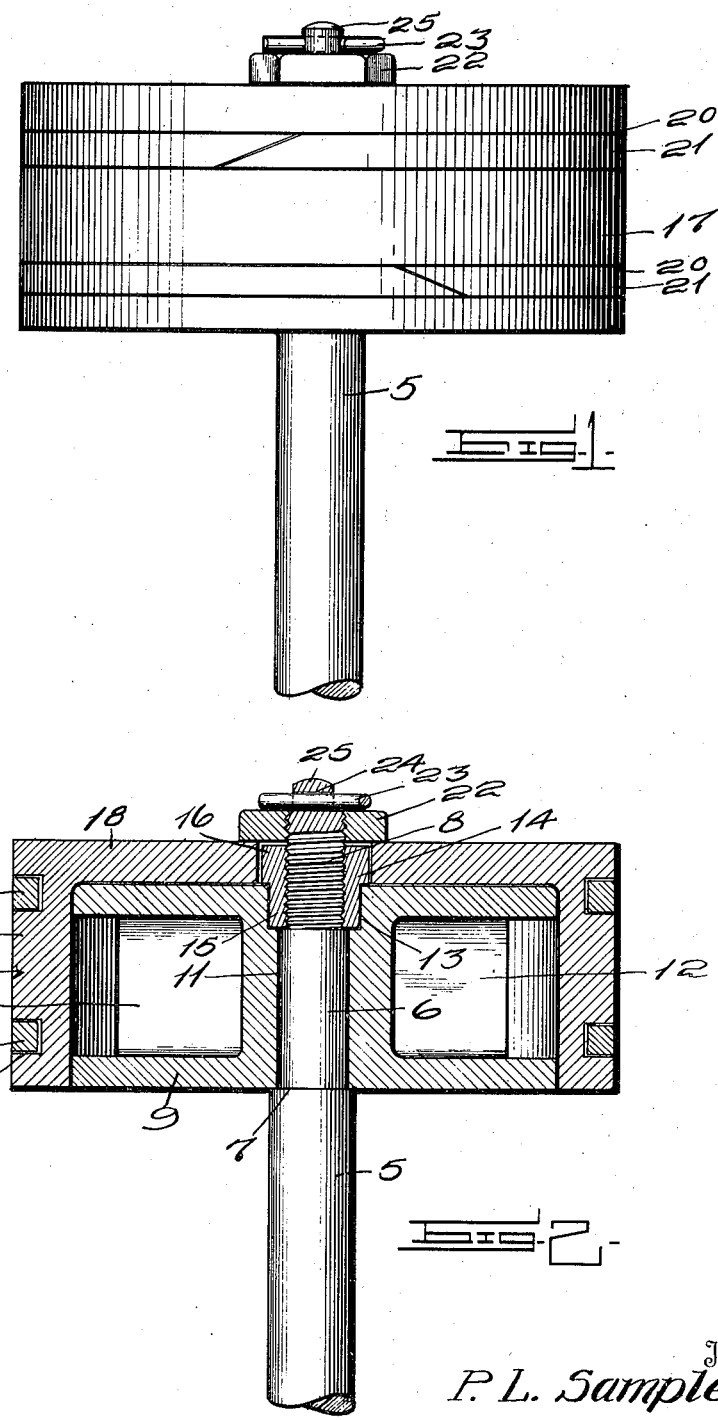

UNITED STATES PATENT OFFICE.

PINKNEY LAFAYETTE SAMPLE, OF MOBILE, ALABAMA.

PISTON.

1,134,911.

Specification of Letters Patent. Patented Apr. 6, 1915.

Application filed August 5, 1914. Serial No. 855,225.

*To all whom it may concern:*

Be it known that I, PINKNEY L. SAMPLE, a citizen of the United States, residing at Mobile, in the county of Mobile and State of Alabama, have invented certain new and useful Improvements in Pistons, of which the following is a specification.

My invention relates to improvements in pistons for engines of the reciprocatory type, such as are operated by steam, compressed air, or an explosive charge.

An important object of the invention is to provide a piston of the above mentioned character, having an inner member or head to be permanently attached to the piston rod, and an outer removable member or casing which is subjected to the wear, and which may be conveniently removed from and placed upon the inner member, whereby the piston as a whole may be repaired at a small cost.

A further object of the invention is to provide a piston of the above mentioned character, which is simple in construction, inexpensive to manufacture, highly convenient in use, strong and durable.

Other objects and advantages of the invention will be apparent during the course of the following description.

In the accompanying drawings forming a part of this specification and in which like numerals are employed to designate like parts throughout the same, Figure 1 is a side elevation of a piston embodying my invention, and, Fig. 2 is a central longitudinal sectional view through the same.

In the drawings, wherein for the purpose of illustration is shown a preferred embodiment of my invention, the numeral 5 designates a piston rod, provided at its inner end with a smooth reduced portion or extension 6, affording a stop-shoulder 7. This smooth reduced portion carries a further reduced screw-threaded portion 8, as shown.

The numeral 9 designates an inner member or head, adapted to be permanently secured to the piston rod 5, and having a centrally arranged opening 11, to receive the smooth extension 6, the same engaging at one end with the stop-shoulder 7. The inner member or head 9 is preferably provided with interior openings or cored out portions 12, to render the same sufficiently light. Having screw-threaded engagement with the screw-threaded portion 8 is an inner clamping nut 14, embodying an inner preferably cylindrical portion 15 and an outer preferably polygonal portion 16, to be engaged and turned by a wrench or the like. The inner portion 15 of the clamping nut 14 extends into an opening or recess 13, formed in one end of the member or head 9, as shown. It is obvious that the clamping nut 14 coöperates with the stop-shoulder 7, to lock the inner member or head 9 to the piston rod.

The numeral 17 designates an outer removal member or casing, as a whole, embodying a disk 18 carrying a laterally extending annular flange 19, provided with exterior annular grooves 20, to receive packing 21, as shown. The outer casing 17 is adapted to fit upon the inner member or head 9, protecting the same against wear. The screw-threaded extension 8 of the piston rod 5 projects beyond the clamping nut 14 and the opening within the disk 8, receiving the clamping nut 14, and is engaged by an outer clamping nut 22, as shown. This outer clamping nut serves to lock the casing 17 to the inner member or head 9. The outer clamping nut 22 is held against improper turning movement by a transverse pin 23, passing through an opening 24, formed in an extension 25, upon the free end of the screw-threaded portion 8, as shown.

In use, the inner member or head 9 is permanently secured to the piston rod 5. The outer casing 17, by manipulation of the outer clamping nut 22, may be readily placed upon and removed from the inner member or head 9. It is obvious that the outer casing 17 may be removed and a new one substituted therefor, without disturbing the inner head or member 9.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. The combination with a piston rod, having a reduced extension affording a stop-shoulder and provided with a screw-threaded portion, of an apertured inner head to be permanently mounted upon the reduced extension in engagement with the stop-shoulder with the screw-threaded portion of the extension extending outwardly beyond the same, an inner clamping nut engaging the screw-threaded portion of the extension and coöperating with the stop-shoulder to lock the head to the piston rod, an outer casing removably mounted upon the inner head, and an outer clamping nut engaging the screw-threaded portion of the extension to hold the outer casing in place.

2. The combination with a piston rod, having a reduced extension affording a stop-shoulder and provided with a screw-threaded portion, of an apertured inner head to be permanently mounted upon the reduced extension in engagement with the stop-shoulder with the screw-threaded portion of the extension extending outwardly beyond the same, an inner clamping nut engaging the screw-threaded portion of the extension and coöperating with the stop-shoulder to lock the head to the piston rod, an outer casing removably mounted upon the inner head, an outer clamping nut engaging the screw-threaded portion of the extension to hold the outer casing in place, and means to prevent improper rotation of the outer clamping nut.

In testimony whereof I affix my signature in presence of two witnesses.

PINKNEY LAFAYETTE SAMPLE.

Witnesses:
ANDREW NICHOLAS,
ROBERT E. NEELY.